(12) United States Patent
Olson (10) Patent No.: US 10,112,449 B2
(45) Date of Patent: *Oct. 30, 2018

(54) BALL HITCH WITH LOCKING SWIVEL AND RAMP

(71) Applicant: POWER PIN INC., Fort Qu'Appelle, KY (US)

(72) Inventor: Brian R. Olson, Fort Qu'Appelle (CA)

(73) Assignee: POWER PIN INC., Fort Qu'Appelle (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,719

(22) Filed: Dec. 11, 2017

(65) Prior Publication Data

US 2018/0099536 A1    Apr. 12, 2018

Related U.S. Application Data

(63) Continuation of application No. 15/038,199, filed as application No. PCT/CA2015/000006 on Jan. 7, 2015, now Pat. No. 9,873,299.

(30) Foreign Application Priority Data

Jan. 8, 2014   (CA) ...................................... 2838624

(51) Int. Cl.
   *B60D 1/06*    (2006.01)
   *B60D 1/36*    (2006.01)
   *B60D 1/28*    (2006.01)

(52) U.S. Cl.
   CPC ............... *B60D 1/065* (2013.01); *B60D 1/28* (2013.01); *B60D 1/36* (2013.01)

(58) Field of Classification Search
   CPC ... B60D 1/02; B60D 1/04; B60D 1/28; B60D 1/30; B60D 1/36; B60D 1/66; B60D 1/065; B60D 1/62; A01B 59/006; Y10T 403/32631; Y10T 403/32803
   USPC .................................................. 280/477, 512
   See application file for complete search history.

(56) References Cited

U.S. PATENT DOCUMENTS

| | | | | |
|---|---|---|---|---|
| 3,830,580 | A | * | 8/1974 | Slattery .................. B60D 1/065 280/512 |
| 4,018,453 | A | * | 4/1977 | Bigelow ................ B60D 1/065 114/230.1 |
| 5,427,399 | A | * | 6/1995 | Olson .................. A01B 59/042 280/508 |

(Continued)

*Primary Examiner* — Joseph M Rocca
*Assistant Examiner* — Daniel S Yeagley
(74) *Attorney, Agent, or Firm* — King & Schickli, PLLC (57) ABSTRACT

A socket hitch apparatus comprises a socket member defining a socket. A swivel member is attached to the socket member about a horizontal swivel pivot axis located rearward of the socket, such that the swivel member can pivot from an open position to a closed position. The front ball engaging portion of the swivel member defines a ball recess between upper and lower recess ends, the recess configured such that as the hitch ball moves upward into the socket, same pushes the upper recess end upward and when the hitch ball reaches the top of the socket, the swivel member is locked in the closed position and the lower recess end is under a periphery of the hitch ball. A forward end of a lower surface of a ramp member is located below a rear edge of the socket and slopes downward and rearward from the forward end thereof.

13 Claims, 7 Drawing Sheets

(56) References Cited

U.S. PATENT DOCUMENTS

| | | | |
|---|---|---|---|
| 5,887,885 A * | 3/1999 | Byers | B60D 1/065 |
| | | | 280/511 |
| 5,997,025 A | 12/1999 | Wisecarver | |
| 6,505,849 B1 | 1/2003 | Ebey | |
| 7,434,826 B1 | 10/2008 | Lambros | |
| 7,690,673 B1 | 4/2010 | Kraai | |
| 8,342,559 B1 | 1/2013 | Mackarvich | |
| 8,444,169 B1 | 5/2013 | Katz | |
| 9,669,672 B2 * | 6/2017 | Ye | B60D 1/065 |
| 2007/0205580 A1 * | 9/2007 | Hamilton | B60D 1/363 |
| | | | 280/477 |
| 2008/0093823 A1 * | 4/2008 | Pratchler | B60D 1/065 |
| | | | 280/507 |
| 2012/0098236 A1 * | 4/2012 | Works | B60D 1/065 |
| | | | 280/507 |
| 2016/0311279 A1 * | 10/2016 | Scharmuller | B60D 1/065 |

* cited by examiner

BALL HITCH WITH LOCKING SWIVEL AND RAMP

This invention is in the field of hitches for connecting a trailer or like towed vehicle to a towing vehicle, and in particular a socket hitch apparatus for securing a receiver socket on a trailer hitch to a hitch ball on a towing vehicle.

BACKGROUND

Connecting mechanisms for towed vehicles take a variety of forms, such as clevis and tongue mechanisms, ball and socket mechanisms, pintle hook and ring mechanisms, and the like.

Ball and socket connections comprise a spherical ball extending upward from a base attached to the towing vehicle, and a receiver socket that is attached to the trailer tongue and drops over and engages the ball to make the connection. A locking mechanism prevents the ball and socket from disengaging. The socket assembly on the trailer tongue typically includes some manner of clamp mechanism that engages the ball to prevent the socket from moving out of engagement with the ball. The ball and socket connection allows horizontal and vertical relative movement between the towing and towed vehicles.

Such ball and socket hitch systems are disclosed for example in U.S. Pat. No. 5,997,025 to Wisecarver, U.S. Pat. No. 7,434,826 to Lambros, U.S. Pat. No. 8,444,169 to Katz, U.S. Pat. No. 8,342,559 to MacKarvich, U.S. Pat. No. 7,690,673 to Kraai, and U.S. Pat. No. 6,505,849 to Ebey. The systems are quite complex with numerous parts and typically include a spring to bias some part of the mechanism against the ball.

SUMMARY OF THE INVENTION

The present disclosure provides a socket apparatus for engaging the ball of a ball and socket hitch connection that overcomes problems in the prior art.

In a first embodiment the present disclosure provides a socket apparatus for connecting a towed vehicle to an upward extending hitch ball attached to a towing vehicle by lowering the socket apparatus onto the hitch ball. The apparatus comprises a socket member defining a socket with an open bottom, the socket member adapted at a rear end thereof for attachment to the towed vehicle. A swivel member is pivotally attached to the socket member about a substantially horizontal swivel pivot axis located rearward of the socket, such that the swivel member can pivot from an open position, where a forward ball engaging portion of the swivel member is in a lowered position and a lug portion of the swivel member is in a forward position, to a closed position where the ball engaging portion is in a raised position and the lug portion is in a rearward position. The ball engaging portion of the swivel member defines a ball recess between upper and lower recess ends, and the ball recess is configured such that as the socket member is lowered with the swivel member in the open position, the hitch ball moves upward into the socket and pushes the upper recess end upward and when the hitch ball reaches the top of the socket, the swivel member is in the closed position and the lower recess end is under a periphery of the hitch ball. A lock mechanism is operative to releasably secure the swivel member in the closed position.

The socket apparatus requires no springs as are common in present ball and socket type hitch systems. The socket apparatus is simple to use, economical to make, and requires reduced maintenance. The apparatus locks onto a hitch ball automatically when the socket member is lowered onto the ball. Disconnection is simple as well, and after disconnection from a hitch ball, the swivel member is automatically moved to the open position ready for reconnection to another hitch ball.

In a second embodiment the present disclosure provides a socket apparatus for connecting a towed vehicle to an upward extending hitch ball attached to a towing vehicle by lowering the socket apparatus onto the hitch ball. The apparatus comprises a socket member defining a socket with an open bottom, the socket member adapted at a rear end thereof for attachment to the towed vehicle. A ramp member is attached to the socket member with a forward end of a lower surface thereof located below a rear edge of the socket, the lower surface of the ramp member sloping downward and rearward from the forward end thereof to a rearward end thereof. A securing mechanism is movable from an open position, where the bottom of the socket is open to allow the hitch ball to enter the socket, to a closed position where the hitch ball is secured in the socket.

The ramp member facilitates adjusting the relative fore and aft positions of the ball and socket by the ball sliding forward along the unobstructed sloped lower surface of the ramp member which guides the ball forward along the slope and into the socket.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
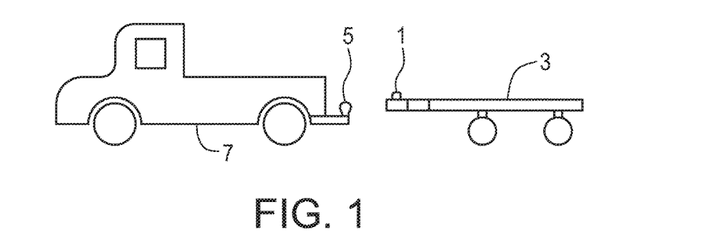
FIG. 1 is a schematic side view of a socket apparatus of the present disclosure mounted on a towed vehicle ready for connection to a hitch ball on a towing vehicle.

FIGS. 1-5 schematically illustrate an embodiment of a socket apparatus 1 of the present disclosure for connecting a towed vehicle 3 to an upward extending hitch ball 5 attached to a towing vehicle 7, as schematically illustrated in FIG. 1, by lowering the socket apparatus 1 onto the hitch ball 5. The apparatus 1 comprises a socket member 9 adapted at a rear end thereof for attachment to the towed vehicle 3 by bolts through sidewalls of the socket member or like arrangements as are known in the art, and defining a socket 11 with an open bottom. A swivel member 13 is pivotally attached to the socket member 9 about a horizontal swivel pivot axis SPA located rearward of the socket 11, such that the swivel member 13 can pivot from an open position shown in FIG. 2, where a forward ball engaging portion 13A of the swivel member 13 is in a lowered position and a lug portion 13B of the swivel member 13 is in a forward position, to a closed position shown in FIGS. 4 and 5 where the ball engaging portion 13A is in a raised position and the lug portion 13B is in a rearward position.

The ball engaging portion 13A of the swivel member 13 defines a ball recess 15 between upper and lower recess ends 15A, 15B. The ball recess 15 is configured such that as the socket member 9 is lowered with the swivel member 13 in the open position, the hitch ball 5 moves upward into the socket 11 as shown in FIG. 2 and contacts the upper recess end 15A and pushes same upward and when the hitch ball 5 reaches the top of the socket 11 as shown in FIG. 4, the swivel member 13 is in the closed position and the lower recess end 15B is under the periphery 5P of the ball 5, with the ball 5 in the recess 15, and a lock mechanism 17 is operative to releasably secure the swivel member 13 in the closed position.

Often in practice the ball 5 may be slightly rearward of the desired location under the socket 11. In the illustrated apparatus 1, the lug portion 13B is quite long and forms a handle. Pushing down on the long lug portion 13B of the swivel member 13 will cause the lower recess end 15B to push the ball 5 forward into proper alignment. Considerable leverage is achieved as the lug portion 13B is much farther from the swivel pivot axis SPA than the lower recess end 15B.

Figure 2:
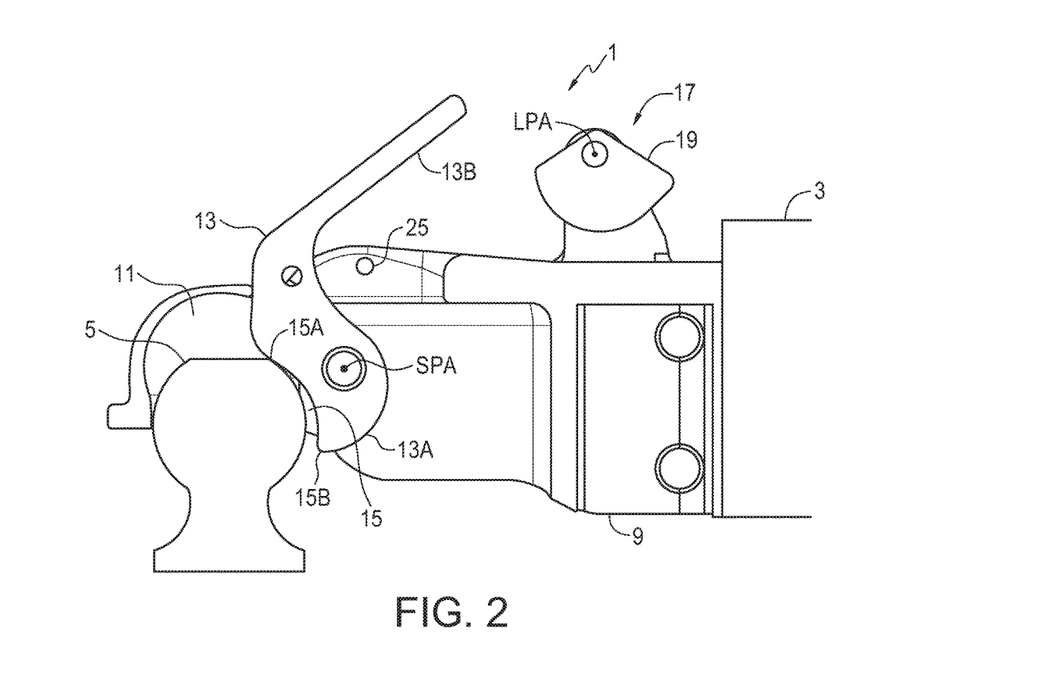
FIG. 2 is a schematic cut-away side view of an embodiment of a socket apparatus of the of the present disclosure with the swivel member in the open position ready to receive a hitch ball.
Figure 3:
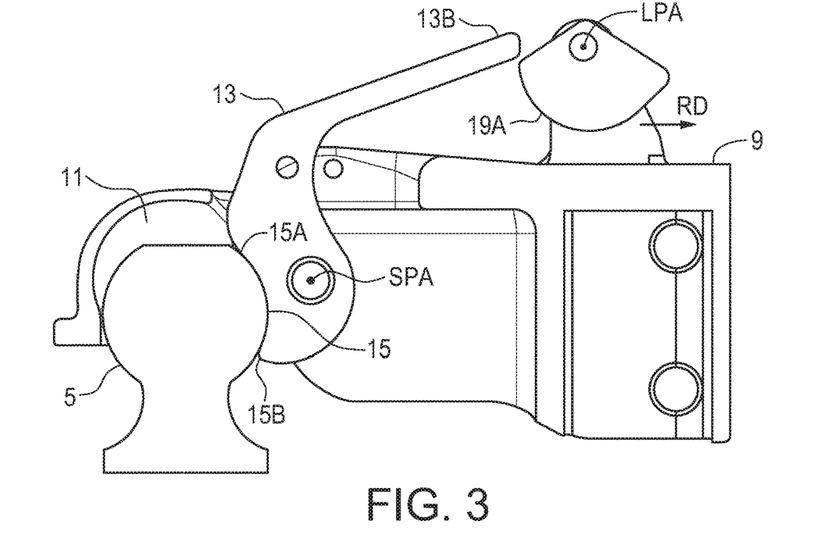
FIG. 3 is a schematic cut-away side view of the embodiment of FIG. 2 where entrance of the hitch ball into the socket has pushed the swivel member to an intermediate position between the open and closed positions.
Figure 4:
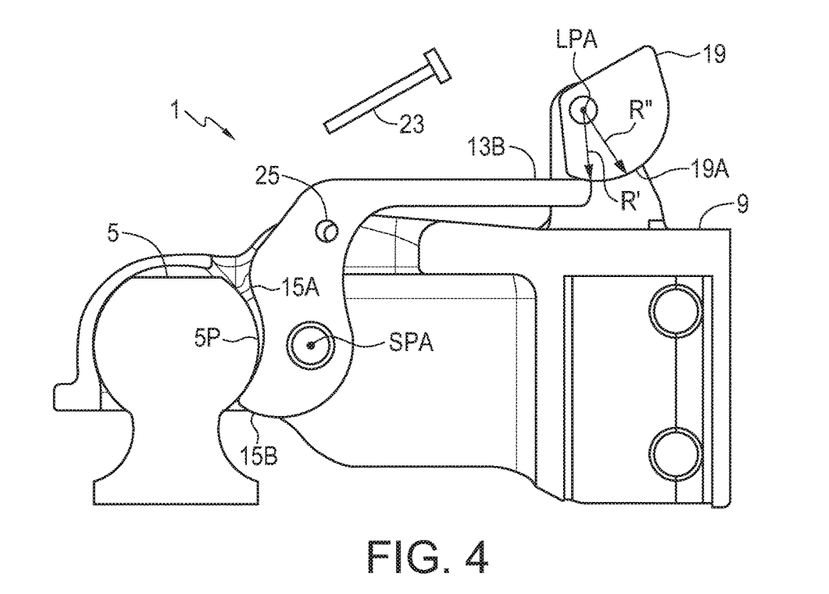
FIG. 4 is a schematic cut-away side view of the embodiment of FIG. 2 where the hitch ball has moved fully into the socket and has pushed the swivel member to the closed positions, with the latch member preventing movement out of the closed position.

The swivel member 13 is movable in a pivot range between the open position of FIG. 2 and the closed position of FIG. 4, and the swivel member 13 is weighted such that when the swivel member 13 is in a balanced position between the open and closed positions, approximately the position shown in FIG. 3, movement of the swivel member 13 toward the open position causes the swivel member 13 to fall to the open position, and movement of the swivel member 13 toward the closed position causes the swivel member 13 to fall to the closed position.

Thus once the swivel member is in the open position of FIG. 2 it will stay in the open position until contacted by the hitch ball 5. As the ball 5 moves upward in the socket 11, pushing against the upper recess end 15A, the swivel member 13 moves to the balanced position of FIG. 3 at which point further upward movement of the ball 5 will tip the swivel member 13 such that gravity will draw the lug portion 13B of the swivel member 13 downward and when the ball 5 reaches the top of the socket the swivel member 13 falls to the closed position of FIG. 4.

Similarly as the socket member 9 is raised with respect to the hitch ball 5 to disconnect the towed vehicle 3 from the towing vehicle 7, the periphery of the hitch ball 5 contacts the lower recess end 15B and moves the swivel member 13 from the closed position of FIG. 4 to the balanced position of FIG. 3 at which point further downward movement of the ball 5 will tip the swivel member 13 such that gravity will draw the lug portion 13B upward as the ball moves downward and the swivel member 13 falls to the open position of FIG. 2 where the ball 5 is fully released.

When the swivel member 13 moves toward the closed position the lug portion 13B contacts and moves the latch member 19 of the locking mechanism 17 and the lock mechanism 17 secures the lug portion 13B to the socket member 9 by blocking movement of the lug portion 13B with the latch member 19 to secure the swivel member 13 in the closed position.

In the illustrated socket apparatus 1, the latch member 19 is pivotally attached to the socket member 9 and hangs in a neutral position shown in FIGS. 1 and 2. The latch member 19 is configured such that when the swivel member 13 moves toward the closed position, contact of the lug portion 13B with the latch member 19, at about the position shown in FIG. 3, pivots the latch member 19 away from the neutral position to an open position as the swivel member 13 moves toward the closed position, and when the swivel member 13 is in the closed position in FIG. 4, because it is weighted to return to the neutral position, the latch member 19 moves toward the neutral position and back over the lug portion 13B, preventing upward movement of the lug portion 13B.

The latch member 19 pivots about a latch pivot axis LPA and hangs in the neutral position below the latch pivot axis LPA such that the lower edge thereof moves in a rearward direction RD toward the open position, and the rear end of the lug portion 13B is under the latch pivot axis LPA when the swivel member 13 is in the closed position of FIG. 4.

The illustrated latch member 19 has a curved lower edge 19A that bears against a top side of the lug portion 13B when the swivel member 13 is in the closed position. The lug portion 13B is between the latch member 19 and the socket member 9 when the swivel member 13 is in the closed position, and in the illustrated lock mechanism 17, the latch member 19 is configured such that the curved lower edge 19A moves closer to the socket member 9 as the latch member 19 moves from the open position to the neutral position. Thus in the illustrated latch member 19, the radius R' is less than the radius R".

Figure 6:
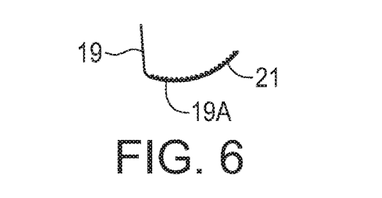
FIG. 6 is a schematic side view showing ridges on the curved bottom side of the latch member.
Figure 7:
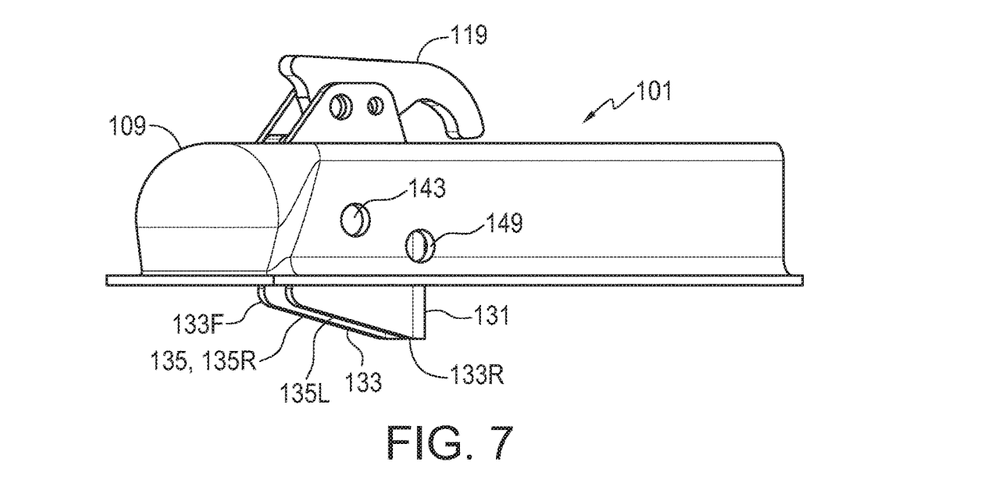
FIG. 7 is a side perspective view of an alternate embodiment of a socket apparatus of the present disclosure.

The latch member 19 is biased toward the neutral position of FIGS. 1 and 2 by weighting, and any vibration during use that causes the lug portion 13A to move down slightly will allow the latch member 19 to move slightly forward, and the increasing radius will keep the lug portion 13B in the slightly lower position, thereby tightening the ball engaging portion 13A of the swivel member 13 against the periphery of the hitch ball 5. Ridges 21 can be provided on the curved lower edge of the latch member 19 as schematically illustrated in FIG. 6, or on the top side of the lug portion 13B so the parts engage somewhat and relative movement between the parts is resisted.

Figure 5:
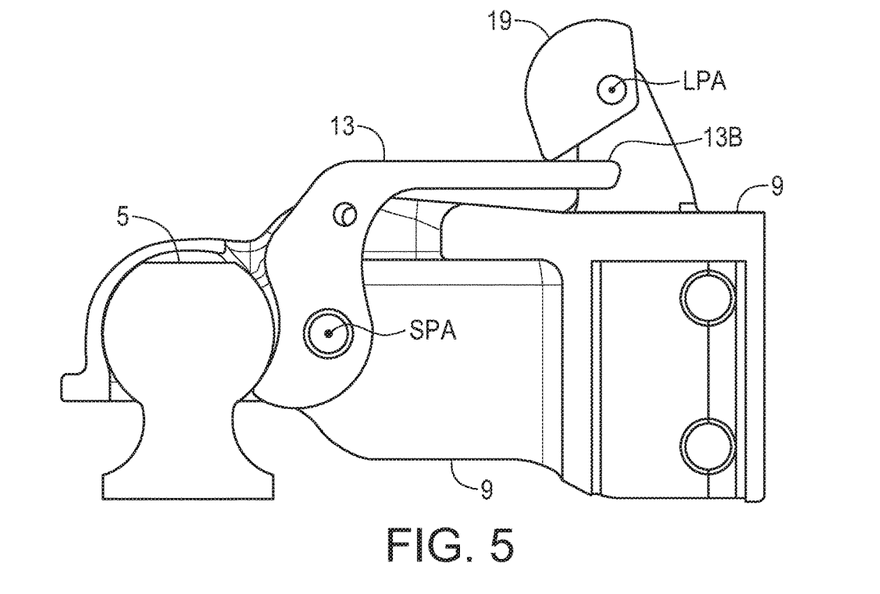
FIG. 5 is a schematic cut-away side view of the embodiment of FIG. 2 where the hitch ball has moved fully into the socket, the swivel member is in the closed position, with the latch member in the reset position allowing the swivel member to move out of the closed position.

The swivel member 13 is released from the closed position by pivoting the latch member 19 rearward toward the open position and through the open position to a reset position as shown in FIG. 5 where a rear end of the latch member 19 rests on the swivel member 13 forward of the latch pivot axis LPA. As the socket member 9 is raised with respect to the hitch ball 5 to disconnect the towed vehicle 3 from the towing vehicle 7, the lug portion 13B of the swivel member 13 moves upward, moving the rear end of the latch member 19 upward and rearward and the latch member 19 falls to the neutral position of FIGS. 2 and 3.

A safety pin 23 may be provided to secure the swivel member 13 in the closed position of FIG. 4 by inserting same into corresponding holes 25 in the swivel member 13 and socket member 9.

It is contemplated that the apparatus 1 can be configured to accommodate hitch balls of slightly different sizes, such as the common 1⅞ inch ball and the 2 inch ball with the same socket apparatus 1.

The socket apparatus 1 has only two moving parts, the swivel member 13 and latch member 19, and requires no springs as are common in the prior art. The socket apparatus 1 requires minimal maintenance. The apparatus 1 is simple to use as it locks onto a hitch ball 5 automatically when the ball 5 enters the socket 11, and when the hitch ball 5 is disconnected, the swivel member 13 is automatically moved to the open position ready for reconnection to another hitch ball.

FIGS. 7-11 schematically illustrate an alternate socket apparatus 101 of the present disclosure for connecting a towed vehicle to an upward extending hitch ball 105 attached to a towing vehicle. Here the latch member 119 is pivotally attached to the socket member 109 about a latch pivot axis LPA such that the latch member 119 can move from a closed position shown in FIG. 10 to an open position shown in FIG. 11. The swivel member 113 comprises a ball engaging portion 113A that defines a ball recess 115 between upper and lower recess ends 115A,115B, and a lug portion 113B.

Figure 8:
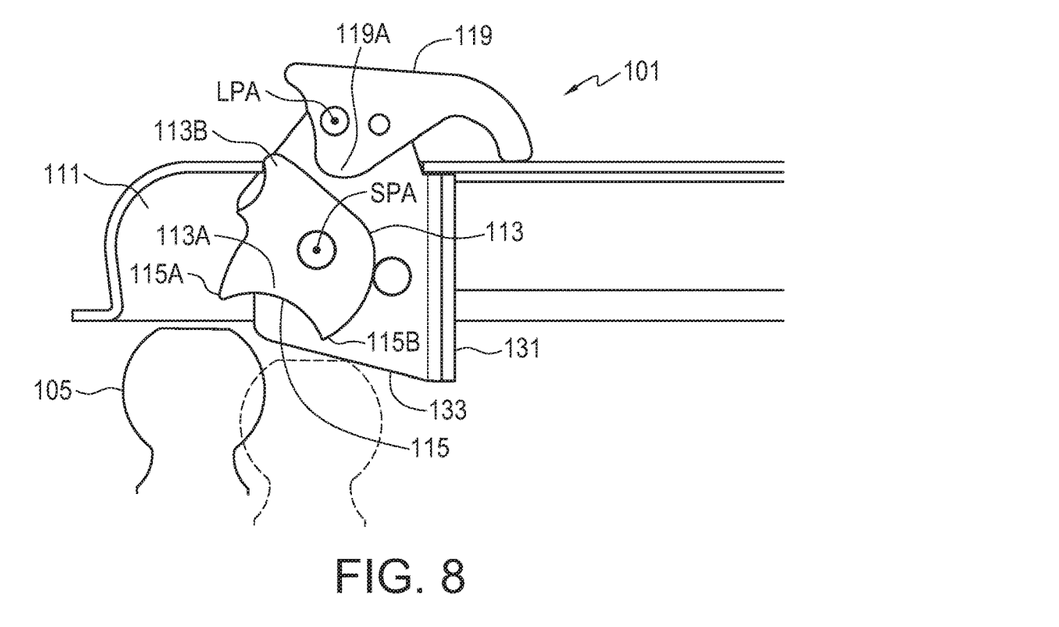
FIG. 8 is a schematic cut-away side view of the embodiment of FIG. 7 in the open position.
Figure 9:
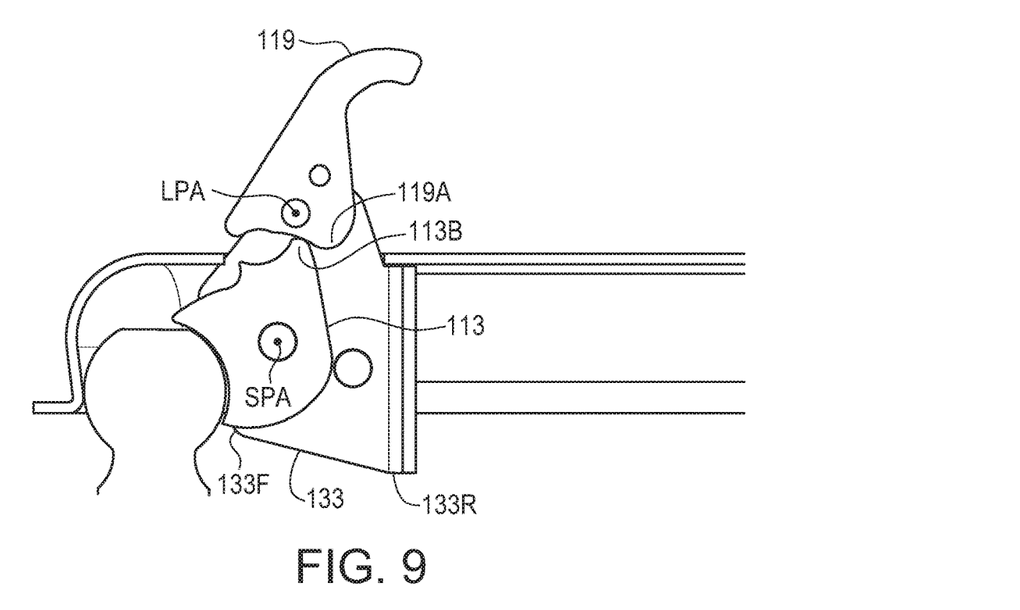
FIG. 9 is a schematic cut-away side view of the embodiment of FIG. 7 with the ball partially entered in the socket.
Figure 10:
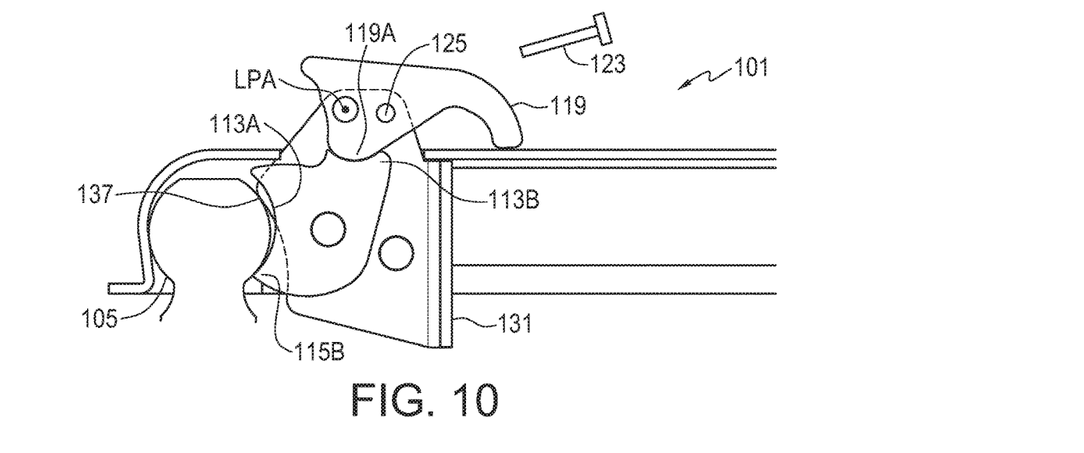
FIG. 10 is a schematic cut-away side view of the embodiment of FIG. 7 with the ball fully entered in the socket and the swivel member in the closed position securing the ball in the socket, and with the latch member closed to prevent movement of the swivel member out of the closed position.

The latch member 119 is configured such that as the swivel member 113 moves, when the hitch ball 105 moves upward in the socket 111, from its open position shown in FIG. 8 toward its closed position shown in FIG. 10 the hitch ball 105 contacts the upper recess end 115A pivoting the swivel plate 113 about the swivel pivot axis SPA such that the lug portion 113B thereof contacts the latch member 119, as seen in FIG. 9, and pivots the latch member 119 away from the closed position toward the open position allowing the swivel plate 113 to move to the closed position of FIG. 10.

When the swivel member 113 is in the closed position the latch member 119 falls to the closed position and prevents movement of the lug portion 113B. In the illustrated apparatus 101 when moving toward the closed position the lug portion 113B of the swivel member 113 contacts a locking portion 119A of the latch member 119 and then moves under the locking portion 119A to the closed position where the lug portion 113B is rearward of the locking portion 119A and the latch member 119 then falls to the closed position with the locking portion 119A blocking movement of the lug portion 113B.

In the illustrated apparatus 101 the rear end 119R of the latch member 119 rests on the socket member 109 rearward of the latch pivot axis LPA when the latch member 119 is in the closed position, and the rear end 119R of the latch member 119 extends upward from the socket member 119 when the latch member 119 is in the open position. A safety pin 123 may be provided to secure the swivel member 113 in the closed position of FIG. 10 by inserting same into corresponding holes 125 in the swivel member 113 and socket member 109.

Figure 11:
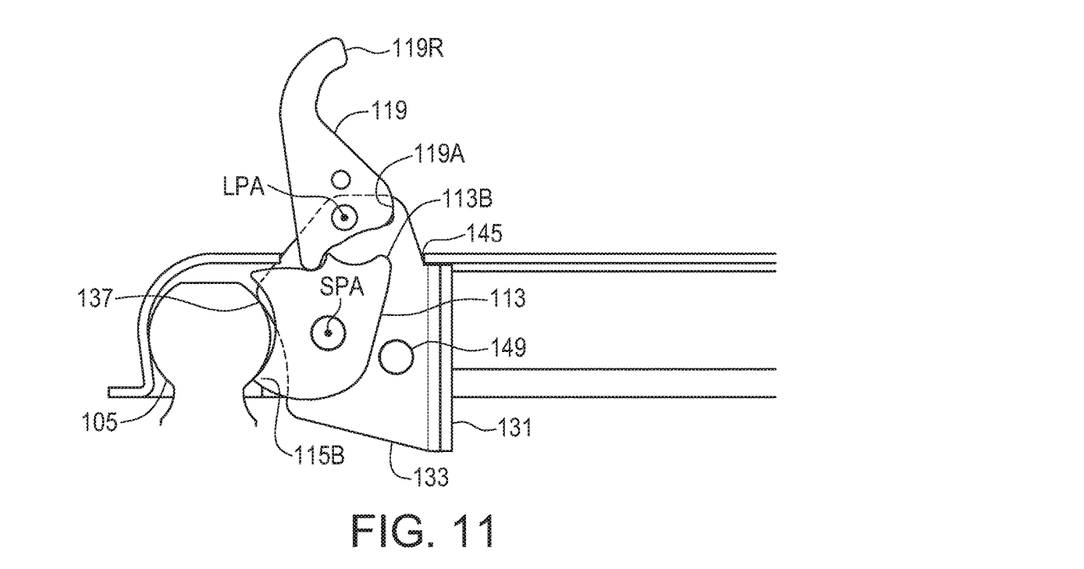
FIG. 11 is a schematic cut-away side view of the embodiment of FIG. 7 with the ball fully entered in the socket and the swivel member in the closed position, and with the latch member in an open position to allow movement of the swivel member out of the closed position and to allow the ball to move downward out of the socket.
Figure 12:
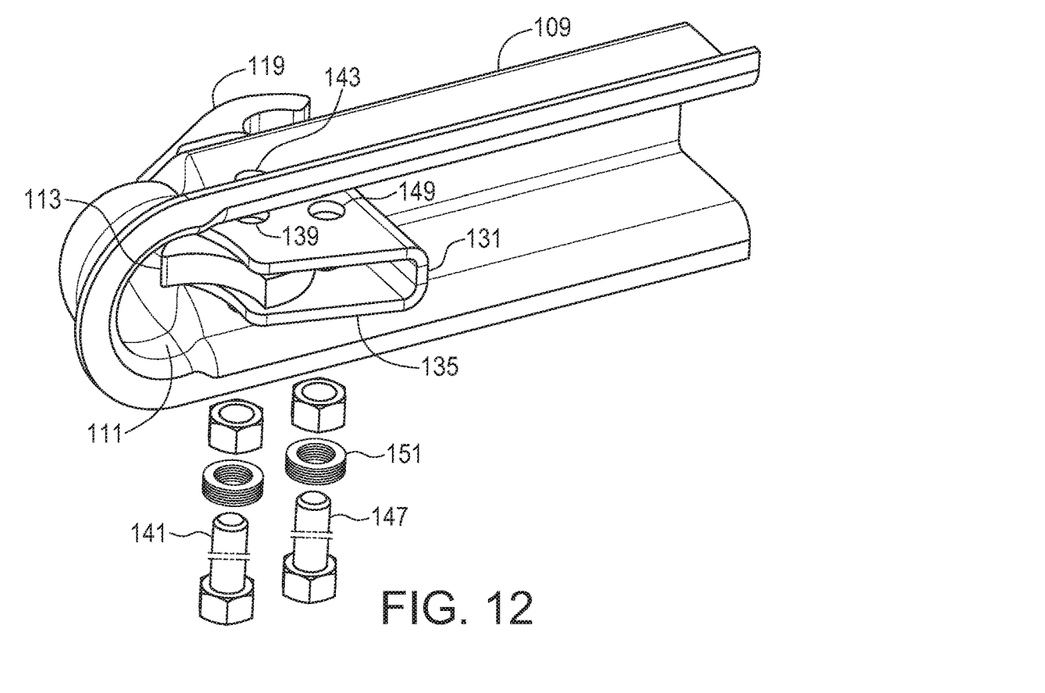
FIG. 12 is a bottom perspective view of the embodiment of FIG. 7.

FIG. 11 shows the latch member 119 in the open position where locking portion 119A of the latch member 119 is raised and no longer blocks movement of the lug portion 113B of the swivel member 113. As the hitch ball 105 moves downward out of the socket 111 it contacts the lower recess end 115B and the swivel member 113 pivots to the open position of FIG. 8, the latch member falls to the position of FIG. 8 and the apparatus 101 is ready to be connected again to a hitch ball 105.

The alternate arrangement of the latch member 119 and swivel member 113 may facilitate manufacturing the various parts and assembling same with bolts and like fasteners rather than welding.

The illustrated apparatus 101 also includes a ramp member 131 attached to the socket member 109 with a forward end 133F of a lower surface 133 thereof located below a rear edge of the socket 111. The lower surface 133 of the ramp member 131 slopes downward and rearward from the forward end 133F thereof to a rearward end 133R thereof.

As mentioned above, often in practice the ball 105 may be slightly rearward of the desired location under the socket 111 as shown by the dotted lines in FIG. 8. Moving the socket member 109 downward causes the ball 105 to bear against the sloping lower surface 133 of the ramp member 131 such that a slight movement forward by the towing vehicle and ball 105 or rearward of the towed vehicle and socket member 109 will cause the ball 105 to slide up the ramp formed by the sloping lower surface 133 and into the open bottom of the socket 111 pushing against the upper recess end 115A of the swivel plate 113. The swivel member 113 in the open position of FIG. 8 is entirely above the lower surface 133 of the ramp member 131 such that the lower surface 133 is unobstructed and the ball 105 can slide freely up the ramp. Thus in the apparatus 101 fore and aft misalignment can be corrected without jamming the securing mechanism.

In the illustrated apparatus 101 the swivel member 113 is pivotally attached to the ramp member 131 which comprises right and left ramp plates 135R, 135L. The swivel member 113 is between the right and left ramp plates 135R, 135L and is pivotally attached to the ramp plates 135. As can be seen in FIG. 10, the upper front edges 137 of the ramp plates 135 are shaped to substantially correspond to the outer surface of the hitch ball 105 such that when the hitch ball 105 is fully inserted in the socket 111 and the swivel member 113 is in the closed position the hitch ball 105 bears against the upper front edges 137 of the ramp plates 135 when the towing vehicle tows the towed vehicle in a forward direction. The upper recess end 115A is slightly rearward of the upper front edges 137 of the ramp plates so the towing force is provided principally by the upper front edges 137 of the ramp plates 135, which can be built quite substantial to resist wear.

Figure 13:
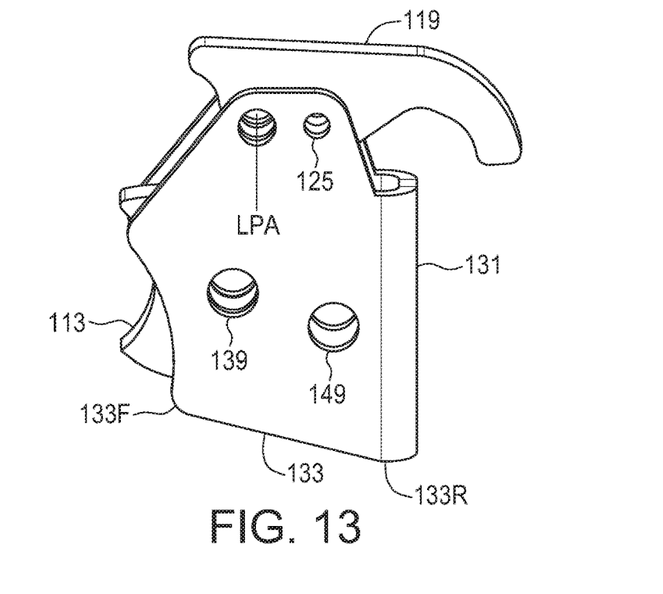
FIG. 13 is a perspective view of the ramp member of the embodiment of FIG. 7 with the swivel member and latch member thereof in place.

In the illustrated apparatus 101 the ramp member 131 is a single plate structure bent and formed as illustrated in FIG. 13 to provide the right and left ramp plates 135 and with a swivel hole 139 to allow for pivotal connection of the swivel member 113 between the ramp plates 135 with a swivel bolt 141 extending through swivel holes 143 in the sidewalls of the socket member 109 and the corresponding swivel holes 139 in the right and left ramp plates 135. Holes in the upper portion of the ramp member 131 allow for pivotal connection of the latch member 119 on the latch pivot axis LPA.

The illustrated ramp member 131 extends upward through an aperture 145 in the socket member 109, as seen in FIG. 11, rearward of the socket 111 and is secured to the socket member 109 by a ramp bolt 147 extending through ramp holes 149 in the right and left ramp plates 135 and through side walls of the socket member 109. Washers 151 fill the space between the inner surfaces of the sidewalls of the socket member 109 and the outer surfaces of the ramp plates 135 to clamp the ramp member 131 securely to the socket member 109.

Figures 14, 15:
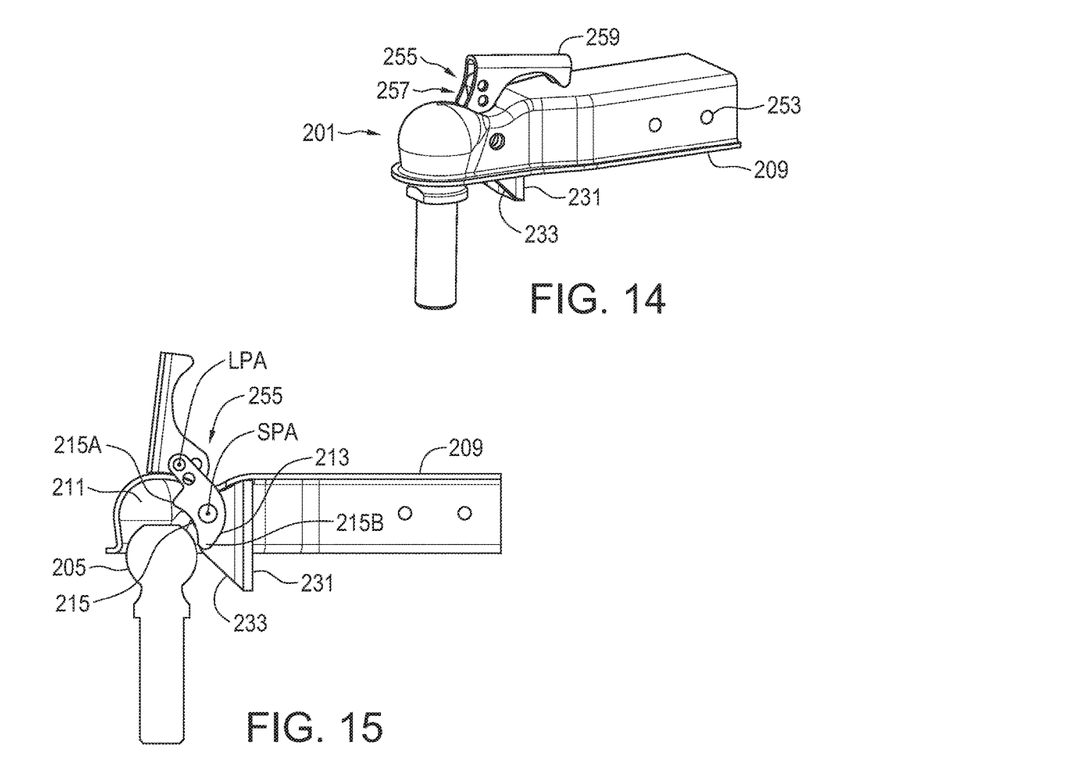
FIG. 14 is a top perspective view of another alternate embodiment of a socket apparatus of the present disclosure.
FIG. 15 is a schematic cut-away side view of the embodiment of FIG. 14 with the securing mechanism in the open position and the ball partially inside the socket.
Figure 16:
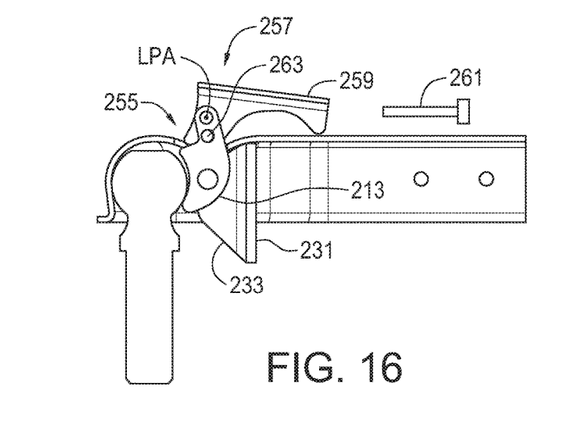
FIG. 16 is a schematic cut-away side view of the embodiment of FIG. 14 with the ball fully engaged in the socket and the securing mechanism in the closed position.

FIGS. 14-16 illustrate a further alternate socket apparatus 201 of the present disclosure for connecting a towed vehicle to an upward extending hitch ball 201 attached to a towing vehicle by lowering the socket apparatus 201 onto the hitch ball 205. The apparatus 201 comprises a socket member 209 defining a socket 211 with an open bottom and adapted at a rear end thereof for attachment to the towed vehicle by bolts through holes 253 in sidewalls of the socket member. In this apparatus 201 the ramp member 231 is attached to the socket member 209 by welding or the like to the socket member 209. The forward end 233F of the lower surface 233 of the ramp member 231 is located below the rear edge of the socket 211 and the lower surface 233 of the ramp member 231 slopes downward and rearward from the forward end 233F thereof to a rearward end thereof 233R.

A securing mechanism 255 is movable from an open position seen in FIG. 15, where the bottom of the socket 211 is open to allow the hitch ball 205 to enter the socket 211, to a closed position shown in FIG. 16 where the hitch ball 205 is secured in the socket 211. When the securing mechanism 255 is in the open position the lower surface 233 of the ramp member 231 is unobstructed.

The illustrated securing mechanism 255 comprises a swivel member 213 with a forward ball engaging portion thereof defining a ball recess 215 between upper and lower recess ends 215A, 215B. The swivel member 213 is pivotally attached to the ramp member 231 about a substantially horizontal swivel pivot axis SPA located rearward of the socket 211 such that the swivel member 213 can pivot from an open position shown in FIG. 15, where the upper recess end 215A is in the socket 211 forward of front edges of the ramp member 231 and the lower recess end 215B is above the lower surface 233 of the ramp member 231, to a closed position shown in FIG. FIG. 16 where the lower recess end 215B is in the socket 211 forward of front edges of the ramp member;

The swivel member 213 is configured such that as the socket member 209 is lowered with the swivel member 213 in the open position, the hitch ball 205 moves upward into the socket 209 and pushes the upper recess end 215A upward and when the hitch ball 205 reaches the top of the socket 211, the swivel member 213 is in the closed position and the lower recess end 215B is under a periphery of the hitch ball 205.

A lock mechanism 257 is operative to releasably secure the swivel member 213 in the closed position. The illustrated lock mechanism 257 comprises a lock lever 259 pivotally attached to an upper end of the swivel member 213 above the socket member 209 about a lock pivot axis LPA and configured to draw the swivel member 213 to the closed position when it is moved downward and rearward. A lock pin 261 is then placed through corresponding holes 263 in the swivel member 213 and lock lever 259 to secure the swivel member 213 in the closed position.

The ramp member 131, 231 facilitates adjusting the relative fore and aft positions of the ball 105, 205 and socket 111, 211 by the ball sliding forward along the unobstructed lower surface of the ramp member.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A socket apparatus for connecting a towed vehicle to an upward extending hitch ball attached to a towing vehicle by lowering the socket apparatus onto the hitch ball, the apparatus comprising:
   a socket member defining a socket with an open bottom, and a rear end of the socket member adapted for attachment to the towed vehicle;
   a ramp member attached to the socket member with a forward end of a lower surface of the ramp member located below a rear edge of the socket, the lower surface of the ramp member sloping downward and rearward from the forward end of the ramp member to a rearward end of the ramp member;
   a securing mechanism movable from an open position, where the bottom of the socket is open to allow the hitch ball to enter the socket, to a closed position where the hitch ball is secured in the socket;
   wherein an upper front edge of the ramp member is configured to substantially conform to an outer surface of the hitch ball such that when the hitch ball is fully inserted in the socket and the securing mechanism is in the closed position the hitch ball bears against the upper front edge of the ramp member when the towing vehicle tows the towed vehicle in a forward direction.

2. The apparatus of claim 1 wherein when the securing mechanism is in the open position the lower surface of the ramp member is unobstructed.

3. The apparatus of claim 1 wherein the securing mechanism comprises:
   a swivel member with a forward ball engaging portion of the swivel member defining a ball recess between upper and lower recess ends;
   the swivel member pivotally attached to the ramp member about a substantially horizontal swivel pivot axis located rearward of the socket such that the swivel member can pivot from an open position, where the upper recess end is in the socket forward of front edges of the ramp member and the lower recess end is above the lower surface of the ramp member, to a closed position where the lower recess end is in the socket forward of front edges of the ramp member;
   wherein the swivel member is configured such that as the socket member is lowered with the swivel member in the open position, the hitch ball moves upward into the socket and pushes the upper recess end upward and when the hitch ball reaches the top of the socket, the swivel member is in the closed position and the lower recess end is under a periphery of the hitch ball; and a lock mechanism operative to releasably secure the swivel member in the closed position.

4. The apparatus of claim 3 wherein the ramp member comprises right and left ramp plates and wherein the swivel member is between the right and left ramp plates and is pivotally attached to the ramp plates.

5. The apparatus of claim 4 wherein upper front edges of the ramp plates are shaped to substantially corresponding to an outer surface of the hitch ball such that when the hitch ball is fully inserted in the socket and the securing mechanism is in the closed position the hitch ball bears against the upper front edges of the ramp plates when the towing vehicle tows the towed vehicle in a forward direction.

6. The apparatus of claim 5 wherein the ramp member extends upward through an aperture in the socket member rearward of the socket and is secured to the socket member, and wherein the lock mechanism comprises a latch member pivotally attached about a latch pivot axis to an upper portion off the ramp member above the socket member and between the right and left ramp plates such that the latch member can move from a closed position to an open position.

7. The apparatus of claim 6 wherein when the swivel member is in the open position a lug portion of the swivel member is in a forward position, and when the swivel member is in the closed position the lug portion is in a rearward position, and wherein the latch member is configured such that when the swivel member moves toward the closed position the lug portion of the swivel member contacts the latch member and pivots the latch member away from the closed position toward the open position, and when the swivel member is in the closed position the latch member falls to the closed position and prevents movement of the lug portion.

8. A socket apparatus for connecting a towed vehicle to an upward extending hitch ball attached to a towing vehicle by lowering the socket apparatus onto the hitch ball, the apparatus comprising:

a socket member defining a socket with an open bottom, and a rear end of the socket member adapted for attachment to the towed vehicle;

a ramp member attached to the socket member with a forward end of a lower surface of the ramp member located below a rear edge of the socket, the lower surface of the ramp member sloping downward and rearward from the forward end of the ramp member to a rearward end of the ramp member;

a swivel member movable from an open position, where the bottom of the socket is open to allow the hitch ball to enter the socket, to a closed position where the hitch ball is secured in the socket;

wherein an upper front edge of the ramp member is configured to substantially conform to an outer surface of the hitch ball such that when the hitch ball is fully inserted in the socket and the swivel member is in the closed position the hitch ball bears against the upper front edge of the ramp member when the towing vehicle tows the towed vehicle in a forward direction.

9. The apparatus of claim 8 wherein the swivel member comprises:

a forward ball engaging portion defining a ball recess between upper and lower recess ends;

wherein the swivel member is pivotally attached to the ramp member about a substantially horizontal swivel pivot axis located rearward of the socket such that the swivel member can pivot from an open position, where the upper recess end is in the socket forward of front edges of the ramp member and the lower recess end is above the lower surface of the ramp member, to a closed position where the lower recess end is in the socket forward of front edges of the ramp member;

wherein the swivel member is configured such that as the socket member is lowered with the swivel member in the open position, the hitch ball moves upward into the socket and pushes the upper recess end upward and when the hitch ball reaches the top of the socket, the swivel member is in the closed position and the lower recess end is under a periphery of the hitch ball; and wherein a lock is operative to releasably secure the swivel member in the closed position.

10. The apparatus of claim 9 wherein the ramp member comprises right and left ramp plates and wherein the swivel member is between the right and left ramp plates and is pivotally attached to the ramp plates.

11. The apparatus of claim 10 wherein upper front edges of the ramp plates are shaped to substantially corresponding to an outer surface of the hitch ball such that when the hitch ball is fully inserted in the socket and the swivel member is in the closed position the hitch ball bears against the upper front edges of the ramp plates when the towing vehicle tows the towed vehicle in a forward direction.

12. The apparatus of claim 11 wherein the ramp member extends upward through an aperture in the socket member rearward of the socket and is secured to the socket member, and wherein the lock comprising a latch member comprises a latch member pivotally attached about a latch pivot axis to an upper portion off the ramp member above the socket member and between the right and left ramp plates such that the latch member can move from a closed position to an open position.

13. The apparatus of claim 12 wherein when the swivel member is in the open position a lug portion of the swivel member is in a forward position, and when the swivel member is in the closed position the lug portion is in a rearward position, and wherein the latch member is configured such that when the swivel member moves toward the closed position the lug portion of the swivel member contacts the latch member and pivots the latch member away from the closed position toward the open position, and when the swivel member is in the closed position the latch member falls to the closed position and prevents movement of the lug portion.

* * * * *